(No Model.)
W. A. CROWDUS.
PRIMARY BATTERY.
No. 555,303. Patented Feb. 25, 1896.
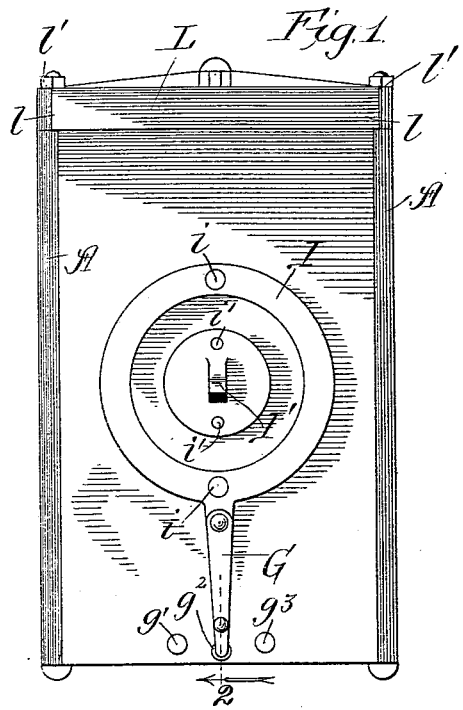
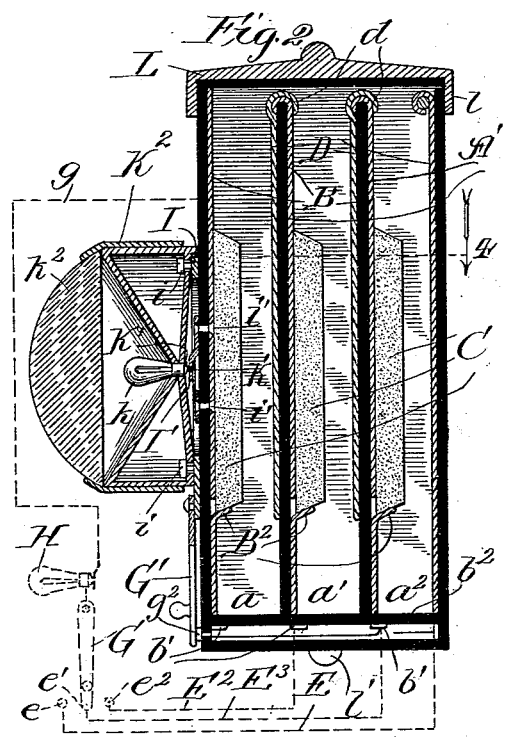
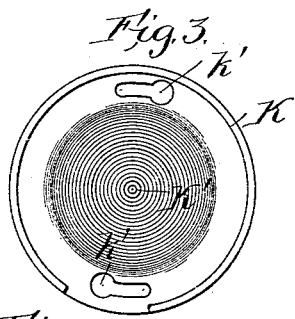
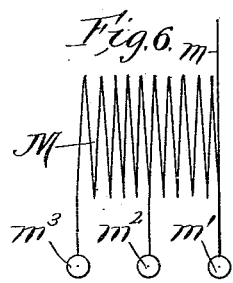
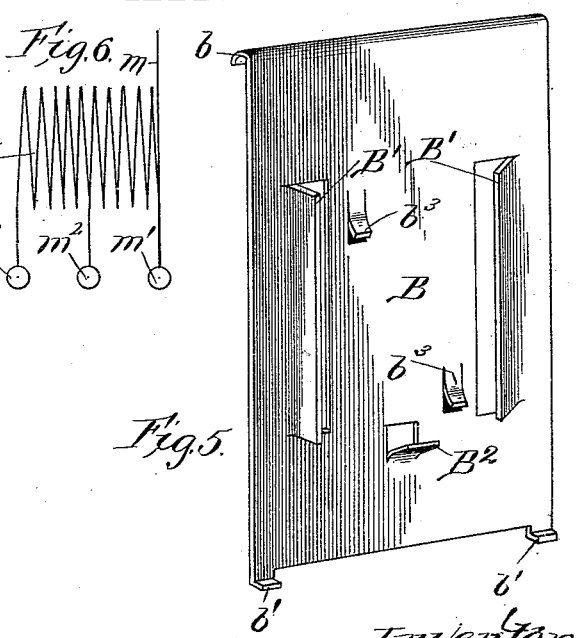
Witnesses:
Inventor:
Walter A. Crowdus,
By Banning & Banning & Sheridan,
Attys.

UNITED STATES PATENT OFFICE.

WALTER A. CROWDUS, OF CHICAGO, ILLINOIS.

PRIMARY BATTERY.

SPECIFICATION forming part of Letters Patent No. 555,303, dated February 25, 1896.

Application filed June 12, 1895. Serial No. 552,504. (No model.)

*To all whom it may concern:*

Be it known that I, WALTER A. CROWDUS, a citizen of the United States, residing at Chicago, Cook county, Illinois, have invented certain new and useful Improvements in Primary Batteries, of which the following is a specification.

My invention relates particularly to that class of galvanic batteries known as "primary" batteries, and especially to the batteries known in the art as "multiple-cell" batteries, in which one case is subdivided into two or more water-tight compartments.

The object of my invention is to provide a simple, economical, efficient and compact primary battery; and the invention consists in the method of connecting the respective cells in series with one another.

It consists, further, in the method of placing and connecting the negative electrodes in their respective cells.

It consists, further, in the composition, manufacture and construction of the negative electrode; and it consists, finally, in the features and combinations hereinafter described and claimed.

In the accompanying drawings, Figure 1 is a front elevation of my battery, showing the switch and connections; Fig. 2, a vertical sectional elevation taken on line 2 of Fig. 1, showing an incandescent lamp in connection with my battery and a diagrammatic view of the connections of the different cells with the switch in dotted outlines; Fig. 3, a rear view of the lamp-reflector and coupling device for attaching the same to battery and connections; Fig. 4, a plan view of the battery, looking at it from the top, with cover and lamp removed; Fig. 5, a perspective view of the metallic pocket for receiving and holding by spring-contacts the negative element, and Fig. 6 a diagrammatic view of the resistance-coil hereinafter described.

There are various disadvantages attending the use of multiple-cell batteries as now constructed, principally in the connections between the different elements from cell to cell.

My invention is intended to obviate defective connections by constructing a battery in which the connections are made in an automatic manner each time the battery is recharged, thus always insuring a fresh and clean connection.

In constructing my battery I prefer to use a case A, formed preferably of hard rubber or other light insulating material. This case is divided into any suitable number of compartments $a$, $a'$, and $a^2$, which form the individual cells of the battery by means of the partitions A', which are formed integral with the case, and which also form an insulating and water-tight barrier between the cells. Each of these individual cells is provided with a supporting-piece, or what I prefer to term a "metallic pocket" B, adapted to receive and hold the negative elements C. This metallic pocket is provided with a hook, as at $b$, which is passed over the upper part of the partition and clinched thereto, while its lower edge is provided with two projecting lugs $b'$, which are passed underneath a false bottom $b^2$. This metallic support or pocket is then secured to the partition in such manner as to form part of it and aid in strengthening it. To form the pocket proper I stamp or cut out of the metal piece two angular projecting flanges B' that form a saddle into which the negative element is forced, while a stop $B^2$ limits the insertion of the negative element and positions the same. Two spring-projecting contact-pieces $b^3$ serve to firmly hold the negative element in its pocket, and at the same time form a good electric contact between the negative element and its metallic supporting-pocket.

The positive element is formed of a zinc plate or strip D, which is provided with an upper hooked edge $d$, and is suspended in the individual cells on the opposite side from the metallic pocket, while its hooked edge is passed over the partition on top of the pocket to form the electric connection between the positive and negative elements of the adjacent cells.

The negative element C is preferably made of a shape to fit the metallic pocket, and is formed of carbon and oxide of copper in the following manner: The carbon and oxide are preferably powdered and mixed with from five to ten per cent. of sirup of sugar, and afterward pressed or molded into the desired shape and size, dried and baked. The baking removes the larger portion of the sugar and carbonizes the residuum, leaving the plate very porous, which, from being so rendered porous, presents a larger active surface to the exciting liquid, thereby reducing the internal resistance of the cell.

By combining carbon with oxide of copper the electric potential of the negative element is increased in the following ways: first, by combining with the oxide of copper an element that stands higher in the scale of electric potential than the copper, and, second, by combining with the oxide a passive conductor of electricity for reducing the resistance of the element. While it is true that only the oxide of copper absorbs the hydrogen disengaged by the action of the battery, its close union and intermixture with the oxide prevents the hydrogen from polarizing the carbon particles.

The exciting fluid that I prefer to use is a caustic alkali solution, such as soda or potash. The further actions and reactions of the battery I do not consider it necessary to describe, and, therefore, for the sake of brevity, will leave out a detailed description.

To increase or decrease, or, in other words, to regulate the discharge of current from the battery, I provide separate wires E, $E^3$, and $E^2$, each leading from an individual cell to independent switch-points $e$, $e'$, and $e^2$, preferably located on the outer surface of the battery-case, as shown in dotted outlines in Fig. 2. A pivoted switch-lever G, also shown in dotted outlines, is secured to the outer surface of the case and connected by means of a wire $g$ with negative element of the first cell, while the wire E leads to the positive element of the last cell.

It will be noticed that whenever the switch-lever G is placed in electric contact with the switch-point $e$ the full number of cells are placed in circuit with the two terminals of the battery. When the lever, as shown in dotted outlines in Fig. 2, is in contact with the switch-point $e'$, the electric circuit is broken with the cell $a^2$ and established with cell $a'$, as the last cell of the series, through wire $E^3$, metallic pocket of cell $a^2$, to the zinc of cell $a'$. When the switch is moved to contact with the switch-point $e^2$, the cells $a'$ and $a^2$ are both cut out and electric connection established with cell $a$ only through the wire $E^2$, metallic pocket in cell $a'$, with the zinc plate in cell $a$, thus leaving only this cell in circuit with the two terminals of the battery. The wires E, E', and $E^2$ in actual use are passed between the false and regular bottoms of the battery-case and fastened to the projecting lugs $b'$ of the supporting-pocket. The space between these bottom portions is then filled with a wax substance which practically makes a solid hard-rubber bottom.

In the dotted diagram of Fig. 2 an incandescent lamp H is interposed between the terminals, so that the movement of the switch-lever from one point to another will give different degrees of light.

In Figs. 1, 2, and 3 I have shown the preferred form in which I desire to construct my lamp and reflector and the method of removably attaching the same to the case. I is a ring-contact piece, rigidly secured to the front of the case in any desired manner and provided with two buttons $i$, that serve to removably hold the reflector in place. A spring-contact I' is secured in a central position within the ring-contact and electrically connected by means of rivets $i'$ with the negative elements in the first cell. A switch-lever G' is pivoted to the ring and adapted to contact the switch-points $g'$, $g^2$, and $g^3$, which are electrically connected with terminals in the different cells in the manner described in connection with the dotted diagram in Fig. 2, so as to cut in or out the desired number of cells. The rear of the reflector K, which carries the lamp $k$, is provided with elongated openings $k'$, adapted to pass over the buttons $i$ of the ring-contact and lock the parts together. A contact-point K' at the center of the reflector connects with one terminal of the filament of the lamp, and is adapted to contact the spring connection I, while the opposite filament-terminal is connected with the metallic portion of the reflector, which, when in position, contacts the ring-contact and furnishes current to the lamp. A cap $K^2$, provided with a lens $k'$, is adapted to be passed over the reflector and lamp for the purpose of condensing the light. A cover L is provided for the battery-case which is provided with downward-depending flanges $l$ and secured to the battery-case by means of bolts and nuts $l'$. This cover is secured to the case in such a manner as to seal the same to prevent the overflow of leakage of the exciting liquid.

Fig. 6 shows a diagrammatic view of another method of regulating the flow of current that may be desired to be drawn from the battery by interposing more or less resistance in the circuit between the terminals of the battery, instead of cutting out cells, as described in the first method. M is a resistance-coil, one end of which is electrically connected with the positive element of cell $a^2$, as is the switch-point, and the switch-point $m^2$ is connected at any desired point of the resistance-coil, so as to interpose in the circuit a small or desired resistance between such point and the terminal of the battery, while the switch $m^3$ interposes the entire resistance-coil. It will thus be seen that when the switch-lever contacts the first switch $m'$, the battery is in circuit without external resistance between its terminals. When the switch-lever contacts the switch-point $m^2$, it will be seen that a small external resistance is interposed between the terminals of the battery, and when the switch-lever contacts with point $m^3$ the entire resistance of the coil is interposed between the terminals of the battery.

While I have described my invention with more or less minuteness as regards details, and as being embodied in more or less precise forms and adapted to certain uses, I do not desire to be limited thereto unduly any more than is pointed out in the claims. On the contrary, I contemplate all proper uses, changes of form, construction and arrangement, the omission of parts and substitution of equivalents, as circumstances may suggest or necessity render expedient.

I claim—

1. A primary battery, having two or more cells, partitions dividing such cells, a metallic conducting-piece hanging from and extending lengthwise with the dividing-partition, a negative element or elements supported thereon and a positive element hooked over and supported by the negative-element support to electrically connect such cells in series, substantially as described.

2. In a primary battery having two or more cells a partition dividing the cells, a metallic conducting-support for the negative element attached to, extending lengthwise with and forming a part of the dividing-partition, a negative element removably secured in the metallic support, and a positive element in the adjacent cell hooked over and suspended from the negative-element support on the dividing-partitions to electrically connect such cells in series, substantially as described.

3. In a primary battery provided with a false bottom having two or more cells electrically connected in series on and across the dividing-partitions, a switch located on and secured to the case, and means disposed beneath the false bottom by which the flow of current from the battery is increased or diminished by the movements of the switch, substantially as described.

4. In a primary battery having two or more cells, positive and negative elements of adjacent cells joined together on and across the dividing-partition to electrically connect such cells in series, a switch located on and secured to the case, and a wire or set of wires connecting the switch with the negative element of each cell individually, and arranged by the switch movements to cut one or more of the cells into and out of action, substantially as described.

5. In a primary battery having two or more cells, elements of the adjacent cells supported and joined on and across the dividing-partitions to electrically connect such cells in series, an incandescent lamp located on and secured to the battery-case, and a switch located on and secured to the case and a wire or set of wires connecting the switch with the negative element of each cell individually, and arranged by the switch movements to cut one or more of the cells into and out of electrical connection with the lamp, substantially as described.

6. In a primary battery a metallic conducting-support adapted to be secured to and form a part of the battery-partition, provided with a spring-pocket for holding the negative element in position and permitting its free insertion or removal, substantially as described.

7. In a primary battery, a negative element of carbon and oxide of copper pressed or molded into desired shape, substantially as described.

8. As a new article of manufacture in primary batteries, a porous negative element of carbon and oxide of copper pressed or molded into a desired shape, substantially as described.

WALTER A. CROWDUS.

Witnesses:
 THOMAS F. SHERIDAN,
 THOMAS B. MCGREGOR.